R. McGAHEY.
COW'S TAIL HOLDER.
APPLICATION FILED JAN. 11, 1915.
1,164,373.
Patented Dec. 14, 1915.
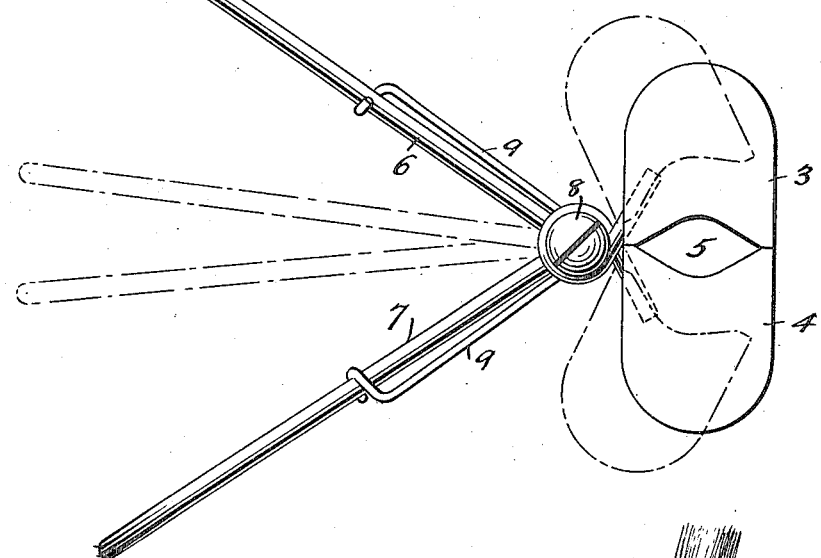
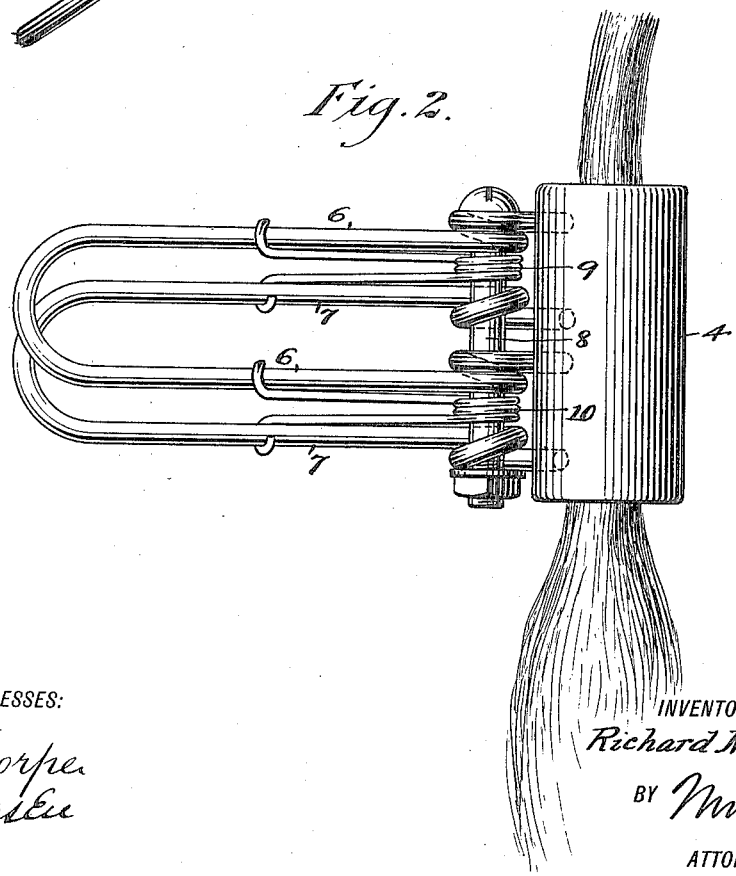
WITNESSES:
Edw. Thorpe
J. E. Larkin
INVENTOR
Richard McGahey
BY
ATTORNEY

UNITED STATES PATENT OFFICE.

RICHARD McGAHEY, OF WALLA WALLA, WASHINGTON.

COW'S-TAIL HOLDER.

1,164,373. Specification of Letters Patent. Patented Dec. 14, 1915.

Application filed January 11, 1915. Serial No. 1,534.

*To all whom it may concern:*

Be it known that I, RICHARD McGAHEY, a citizen of the United States, and a resident of Walla Walla, in the county of Walla Walla and State of Washington, have invented certain new and useful Improvements in Cows'-Tail Holders, of which the following is a specification.

My invention relates to means for preventing a cow from switching her tail while being milked, and one of the main objects thereof is to provide a device which may be instantly placed into and removed from operative position by the person milking the cow, and without the necessity of soiling his or her hands in so doing.

It is common to attach the tail to a leg by means of a strap or string, but this soon becomes highly unsanitary because of the usual condition of the cow's tail, and, in consequence, the milker's hands are rendered absolutely unsanitary, and not fit to do the milking, in the attaching and detaching of such strap or string, and it was in order to overcome any possibility of excuse against cleanliness on the part of careless dairy hands that my invention was conceived.

My invention is fully described in the following specification, of which the accompanying drawings form a part, in which like reference characters are used to designate like parts in each of the views, and in which:—

Figure 1 is a top plan view of my invention, shown in full lines for the operative position, and in dotted lines for the attaching position; and Fig. 2 is a side view thereof in position on a cow's tail.

In the drawings forming a part of this application I have shown a present preferred form of embodiment of my invention, comprising two similar blocks 3 and 4, of heavy material, such as lead, iron, or the like, and each of which is grooved on its inner face to form, with the other block, a channel 5 between said blocks and in which the cow's tail is adapted to be engaged.

The block 3 has a yoke-shaped handle 6 secured thereto, and the block 4 has a similar handle 7 secured thereto, each of said handles being turned one and one-half times around a bolt 8 which forms a pivot for the handles and permits a scissor-like movement thereof. Also turned around the bolt 8 are two springs 9 and 10, the arms of which are directly outwardly to a point intermediate the length of the handles and connected therewith, one arm of each spring being connected with a corresponding portion of the handle 6 and the other arm of each spring being connected with a corresponding portion of the handle 7 to insure a normal, relative, position of the two handles as shown in Fig. 1.

When it is desired to attach the device to a cow's tail, all that is necessary is to manually force the handles 6 and 7 together, thereby separating the blocks 3 and 4 sufficiently far to allow of the insertion of the cow's tail between said blocks and, when the pressure on the handles is relaxed, the springs 9 and 10 close the blocks firmly around the tail, preferably adjacent the lower end of the bony structure of the tail, upon the bunch of hair forming the switch. It will be seen that the tail is thus anchored and milking may proceed without the annoying and unsanitary switching of the tail, and it is to be noted that, after long use with many different cows, no injury has resulted to the cows, and only a temporary annoyance through their inability to switch their tails, for it will be understood that the device is used only during milking. It will also be noted that the person milking has no need to touch the filthy tail, the handles of the device being made long enough to insure their remaining in a cleanly condition but, should the device become soiled from any cause, it may be quickly and easily cleansed as it is composed entirely of metal and is, therefore, non-absorbent.

While I have shown one form of embodiment of my invention, I do not limit myself thereto, as I may make the same in many different forms which act as an anchor for the tail through gravity.

Having fully described my invention, what I claim as new, and desire to secure by Letters Patent, is:—

1. A device of the class described, comprising a weight formed of two grooved blocks, one on each side of a cow's tail to exert strain on the axis of said tail, each block counterbalancing the other, and means for holding the weight in such relationship with the tail.

2. A device of the class described, comprising two grooved blocks, one on each side of a cow's tail to exert strain on the axis thereof, means for tensionally holding said blocks in place, and a releasing handle connected with each block to remove said device.

In testimony whereof I have signed my name to this specification in the presence of two subscribing witnesses.

RICHARD McGAHEY.

Witnesses:
MARVIN EVANS,
GRACE McGUIRE.

Copies of this patent may be obtained for five cents each, by addressing the "Commissioner of Patents, Washington, D. C."